July 10, 1934.    L. C. HUCK    1,965,894
HYDRAULIC BRAKE
Filed June 24, 1931

Inventor
Louis C. Huck
By Blackmore, Spencer & Fluk
Attorneys

Patented July 10, 1934

1,965,894

UNITED STATES PATENT OFFICE 1,965,894

HYDRAULIC BRAKE

Louis C. Huck, Grosse Pointe, Mich.

Application June 24, 1931, Serial No. 546,464

4 Claims. (Cl. 188—152)

This invention relates to brakes, and more particularly to brakes for use on vehicles.

An object of the invention is to provide an improved hydraulic operating mechanism for use with either external or internal brakes.

A further object is to provide a brake-operating means of the hydraulic type with mechanism whereby the mechanical advantage of one part of the frictional resisting means differs from that of another part.

Other objects and advantages will be understood from the following description and the accompanying drawing.

In the drawing—

In my Patent 1,787,527 for Brake for automotive vehicles dated January 6, 1931, I have shown and claimed an invention wherein the inertia of a moving vehicle is employed to supplement the manually applied effort and the structure shown is, as stated in the patent, useful also in the case of brakes actuated entirely, as well as partially, by means other than muscular effort. The structure therein disclosed involves such features as opposed shoes with unequal lengths of lining, shoes with their arcs of lining out of symmetry, and shoes with unequal center distances. These and other factors are designed to give the same amount of self-actuation in the case of the two shoes. The invention also contemplated the control of the mechanical advantage of the parts of the band or the separate shoes to the end that the manual effort as applied to one of the shoes may be more effective than the effort applied to the other shoe. This control of the mechanical advantage was shown as effected by a cam with unequal lobes and also shown in connection with hydraulic brake-applying means which has inherent therein the characteristic of "differentially acting actuating means", an expression fully explained in the patent.

The present invention, which has been substantially shown but not claimed in my prior patent, relates to the means for controlling the mechanical advantage in the case of hydraulic actuating means. It will be understood from the prior patent that even if the opposed shoes of a brake have different arcuate lengths of lining and different center distances and if these factors are so chosen as to give the shoes the same amount of self-actuation, there may still be provided a difference in the mechanical advantage in the case of the manually applied effort in expanding the parts of the band or the individual shoes. The hydraulic means designed to so operate unequally, while it has particular usefulness when associated with the nicely designed structure for securing equal self-actuation, is also useful in any brake where for any reason it is desired to provide a greater mechanical advantage for one of the shoes or for one of the band parts. Being hydraulic it inherently contains the characteristic of differential action to accommodate itself to unequal or opposite self-actuation in the case of the opposed shoes, since the two pistons employed in each of the several embodiments may not only move from and toward each other in the act of brake application and release but may also move together in the same direction to accommodate the self-actuation of the shoes as influenced by the rotating drum.

Figure 1:
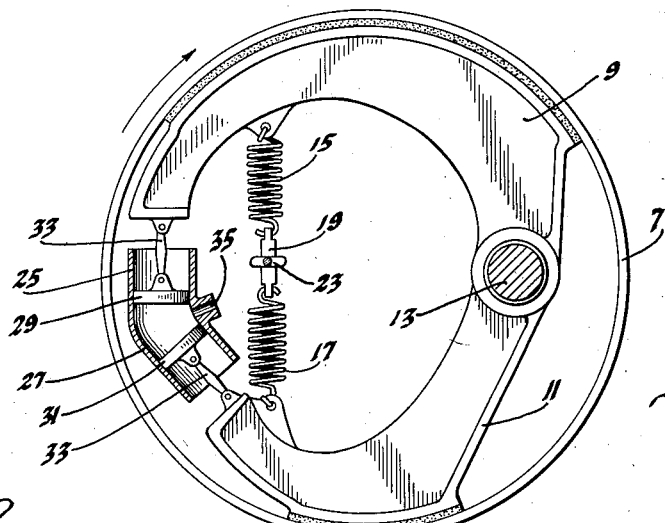
Figure 1 illustrates one embodiment of the invention in side elevation and partly in section.

In Figure 1 the drum 7 is engaged by shoes 9 and 11 having a common pivot 13 carried by the backing plate. Springs 15 and 17 are attached to shoes 9 and 11 respectively. The adjacent ends of the springs are connected to the ends of a connecting link 19 which may be adjustably secured to the fixed plate by fastening means 23. Two cylinders 25 and 27 are formed as parts of one member or are secured together at an obtuse angle to each other. Within the cylinders are pistons 29 and 31 having link connections 33 with the adjacent ends of the shoes, which ends are parallel to the pistons to which they are connected. The cylinder block has an opening 35 for the admission of oil or other liquid medium between the pistons as the means of separating the same and applying the brake. It will be noted that perpendiculars dropped from the extension of links 33 through pivot anchor 13 are of unequal length. The pistons therefore operate with unequal lever arms in rotating the shoes. The piston acting on the shoe 9 which is self-actuating for forward vehicle travel acts with greater mechanical advantage than the piston which expands shoe 11. It will be understood that shoe 9 is rotated by the rotating drum about its pivot in the same direction as it is being rotated by the fluid operated actuating means, while the shoe 11 is rotated away from drum contact by the same drum rotation, this force opposing the fluid operated actuating force. Much of the fluid applied force otherwise effective to expand shoe 9 might be wasted in overcoming the self-actuating force on shoe 11 except for the fact that the two pistons are capable of moving together in the same direction to accommodate the self-actuating forces. In checking forward travel shoe 9 is more effective because it is being expanded by the fluid applied force and the self-actuating force while the self-actuating force on shoe 11 opposes the fluid applied force. The opposite conditions occur in the case of reverse driving. In checking forward travel not only is the long shoe 9 more efficient because of the cumulative nature of the applied forces, but the mechanical advantage of shoe 9 is greater than shoe 11 as explained. As a result a very efficient brake for checking forward travel is ensured.

It will be understood that were the linings of the two shoes 9 and 11 of the same length it might still be desired to have the greater mechanical advantage in the case of shoe 9 which is self-actuating for checking forward travel.

Figure 2:
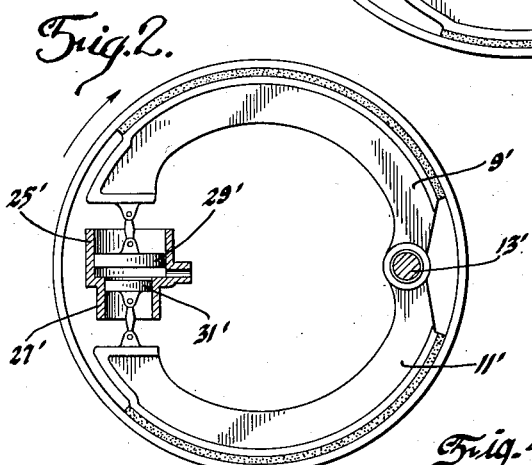
Figure 2 is a similar view of a modified form.

In Figure 1 it will be seen that a diameter through pivot 13 does not intersect the actuating means between the pistons 29 and 31. This construction which is a characteristic of the unequal shoes makes possible the provision of the variation of the mechanical advantage in the way described. Another way of obtaining the same variation of mechanical advantage is shown in Figure 2. This might be used in place of the hydraulic actuating means of Figure 1 but is especially useful in the arrangement shown by Figure 2 where the shoes are of the same length and where the diameter through the common shoe pivot symmetrically intersects the hydraulic actuating means. Figure 2 shows the drum at 7 as before. At 9' and 11' are the two shoes of equal length rotatable on pivot 13'. The cylinder 25' is integral with cylinder 27' and the two cylinders are coaxial. Cylinder 25' is of greater diameter than cylinder 27'. The pistons 29' and 31' therefore vary. Since these pistons are subject to the same unit pressure and since the lever arms of the divided force are equal, the shoe 9' is operated with a greater mechanical advantage than shoe 11'. The action will therefore be similar to that of Figure 1 insofar as the inequality of the mechanical advantage is concerned.

Figure 3:
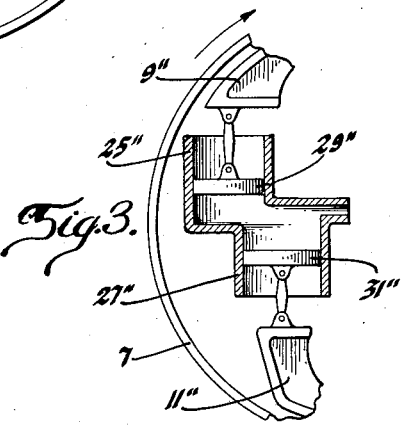
Figure 3 is a similar view of another form.

Figure 3 is a modification applicable to an unequal shoe arrangement similar to that of Figure 1. Here, the variation in mechanical advantage is obtained by offsetting the axes of the cylinders while maintaining them in parallel relation. The shoes 9'' and 11'' are actuated by pistons 29'' and 31'' which reciprocate in cylinders 25'' and 27'' which may be parts of an integral unit. The cylinder axes are in parallelism. The pistons 29'' and 31'' have their rods in parallelism and connected pivotally to the pistons and to the respective brake shoe ends. It will be obvious that these pistons are subjected to the same unit pressure but operate with different mechanical advantages as in Figure 1.

Figure 4:
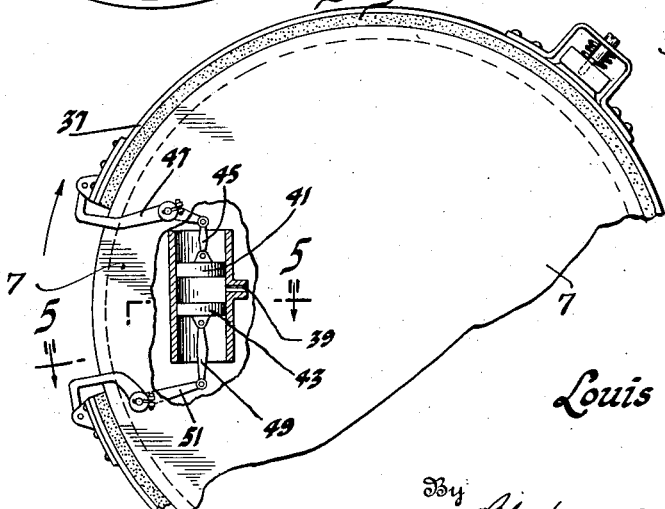
Figure 4 is a similar view of still another form.
Figure 5:
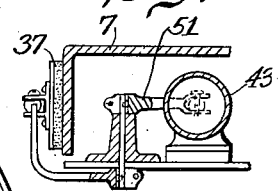
Figure 5 is a section on line 5—5 of Figure 4.

In Figure 4 there is shown an application of the balanced hydraulic actuating means to effect an unequal mechanical advantage in the case of the parts of an external contracting band brake. Here the drum 7 is engaged by a band 37 contracted upon the drum by fluid pressure entering at 39 between pistons 41 and 43. Piston 41 is connected by rod 45 to the short arm of a lever 47. Piston 43 is connected by a rod 49 to the long arm of a lever 51. The other ends of the levers are connected to the adjacent ends of the band 37. If it be desired to render the self-wrapping action more effective for forward than for reverse travel, the band anchor will be located nearer lever 47 than lever 51 as shown.

I claim:

1. In a brake, a drum, a plurality of brake members, means to mount said shoes for rotation in opposite directions into engagement with said drum and to prevent radial movement thereof, hydraulic differentially acting actuating means, said means including a plurality of pistons each having the same area and each subject to the same unit pressure, the brake members associated with the pistons having unequal lever arms.

2. In a brake, a two-part brake member, anchor means located between the ends thereof, hydraulic differentially acting actuating means, said means including a plurlaity of axially movable pistons subject to the same unit pressure, said pistons being out of alignment and movable along such axial lines that the mechanical advantage of one piston upon its brake member exceeds that of the other piston upon its brake member.

3. In a brake, a plurality of brake members, hydraulic differentially acting actuating means, said means including a plurality of pistons subject to the same unit pressure, said pistons having their axes of movement at an obtuse angle to each other, and such axes being so related to the anchorages for the brake members that one piston operates with a greater mechanical advantage than the other.

4. In a brake, a plurality of brake members, hydraulic differentially acting actuating means, said means including a plurality of pistons subject to the same unit pressure, said pistons having their axes of movement in parallel relation whereby the mechanical advantage of one brake member exceeds that of the other.

LOUIS C. HUCK.